Nov. 29, 1949 V. M. BRITTAIN 2,489,615
RADIO AID TO AIR NAVIGATION
Filed Sept. 13, 1947 4 Sheets-Sheet 1

VIRGIL M. BRITTAIN
*INVENTOR.*

BY
*Attorney*

VIRGIL M. BRITTAIN
INVENTOR.

Nov. 29, 1949 V. M. BRITTAIN 2,489,615
RADIO AID TO AIR NAVIGATION
Filed Sept. 13, 1947 4 Sheets-Sheet 4

VIRGIL M. BRITTAIN
INVENTOR.

BY
ATTORNEY

Patented Nov. 29, 1949

2,489,615

UNITED STATES PATENT OFFICE 2,489,615

RADIO AID TO AIR NAVIGATION

Virgil M. Brittain, Portland, Oreg., assignor to Hazeltine Research, Inc., a corporation of Illinois Application September 13, 1947, Serial No. 773,907

4 Claims. (Cl. 343—108)

My invention relates to radio aids to air navigation; more specifically, it relates to the improvement of the micro-wave equi-signal instrument landing system.

The primary object of my invention is the production of a well defined glide path which may be set to any angle of approach, including very low angles. Other objects will become apparent to persons skilled in the art upon reading the remainder of this specification.

Figure 1:
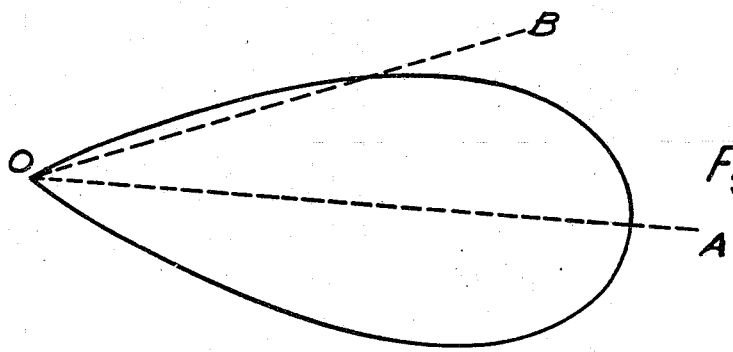
Figure 2:
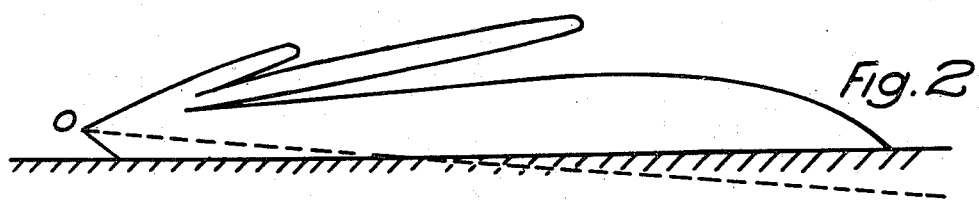
Figure 3:
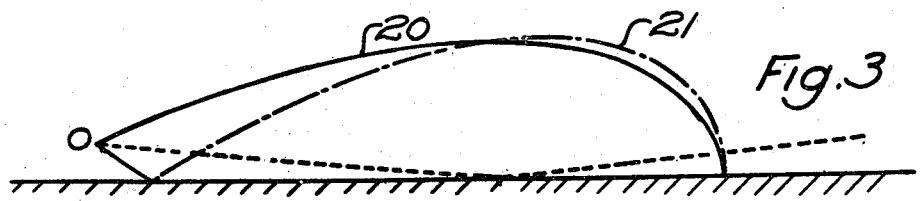
Figure 4:
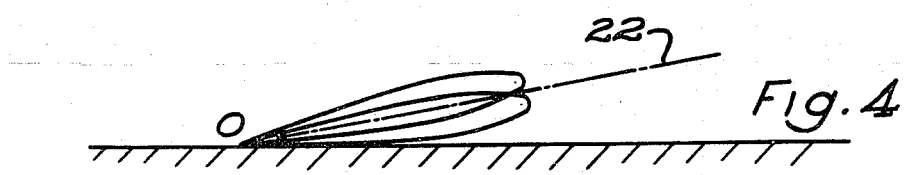
Figure 5:
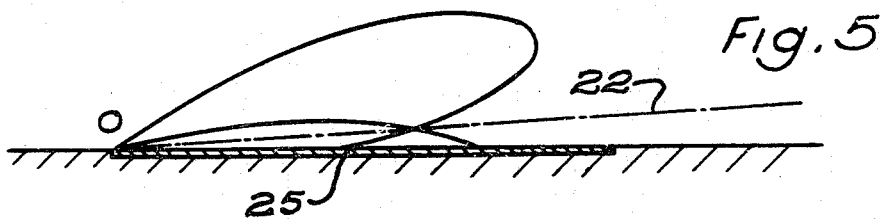
Figure 6:
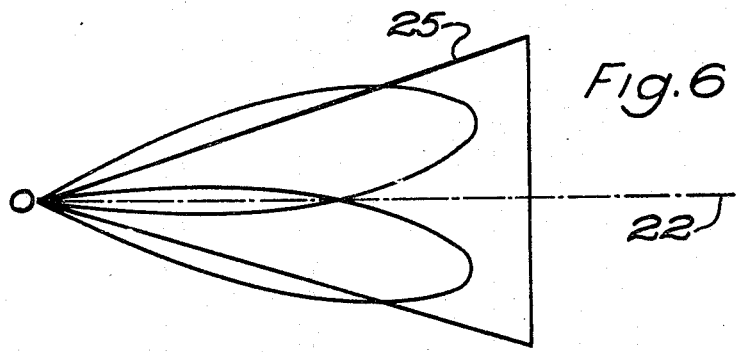
Figure 7:
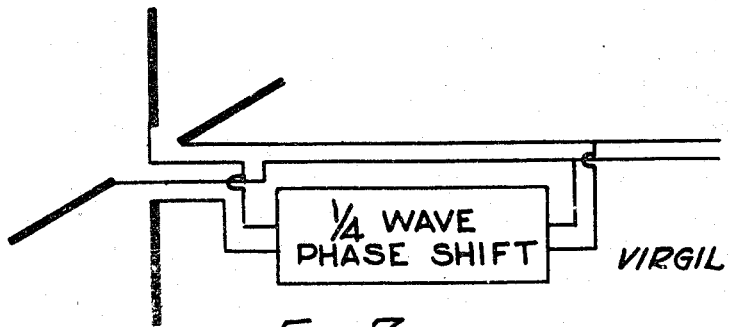
Figure 8:
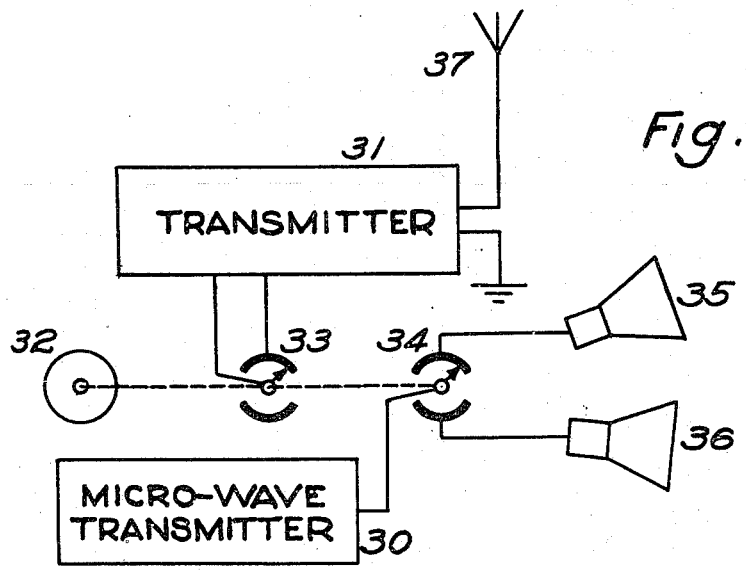
Figure 9:
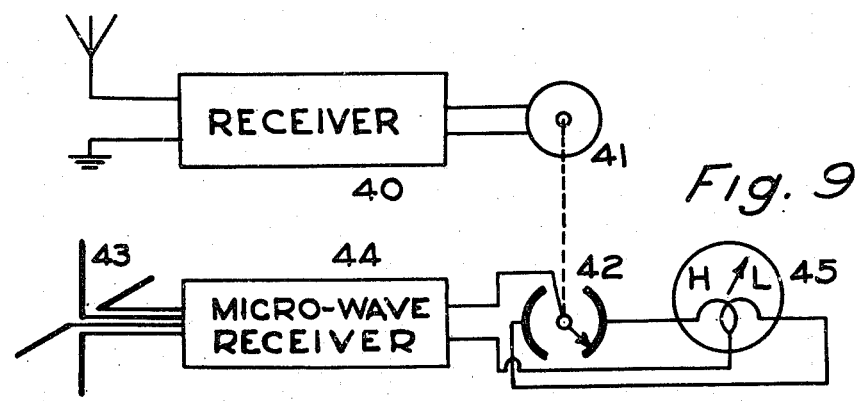
Figure 10:
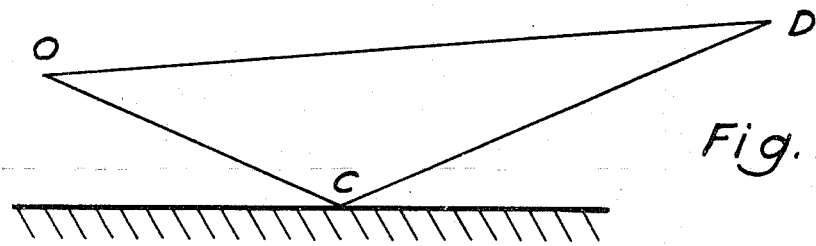
Figure 11:
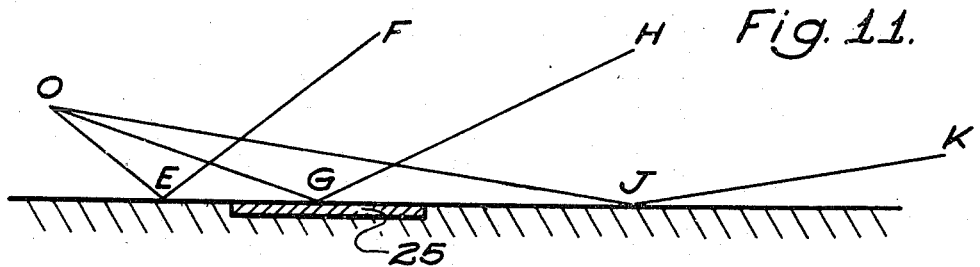
Figure 12:
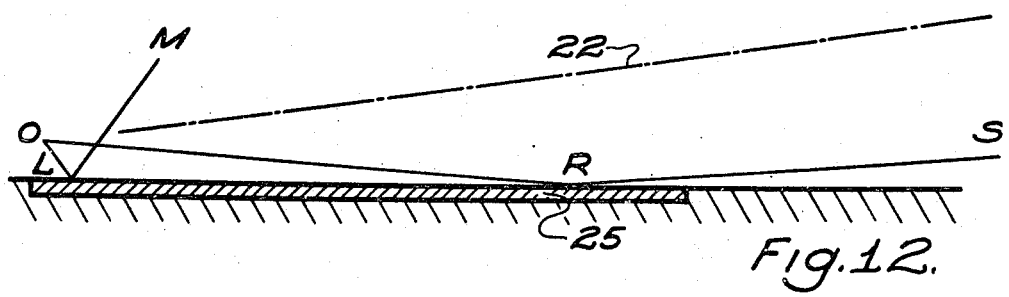

In the drawing, Fig. 1, Fig. 2, and Fig. 3 are antenna field patterns, indicating the shapes of lobes, or beams, of radio waves; these three figures are used to describe certain physical principles. Fig. 4 is an antenna field pattern which shows the undesirable characteristics of the conventional micro-wave equi-signal instrument landing system which are eliminated by my invention. Fig. 5 shows antenna field patterns used with my invention for vertical guidance. Fig. 6 shows antenna field patterns used for horizontal guidance. Fig. 7 shows a basic antenna arrangement for producing circularly polarized radio waves. Fig. 8 is a schematic showing a preferred embodiment of the ground equipment; and Fig. 9 is a schematic showing a preferred embodiment of the airborne equipment. In the figures of the drawing showing antenna field patterns, the letter "O" is used to indicate the origin, or antenna location. Figures 10, 11, and 12 indicate the paths of direct and reflected waves which are emitted from a point O.

Fig. 1 shows a lobe, or beam, of vertically polarized radio waves in free space. Along the line OA the signal strength is maximum. Along the line OB the signal strength is considerably less, but a comparatively small change in the angle AOB will produce a comparatively large change in signal strength. The lobe shown in Fig. 1 is very regular in shape, and is well adapted for use in establishing an equi-signal path along line OB.

Fig. 2 shows a lobe of vertically polarized radio waves that has encountered a reflecting surface, such as the ground. Due to interference between the unreflected and reflected waves, the shape of the lobe is distorted. The reason why this distortion occurs may be explained as follows. Referring to Fig. 10, assume that vertically polarized waves are produced at O, and travel to point D by two routes of different distances, OD and OCD. The amplitude of the wave at point D is the vector sum of the amplitudes of the waves arriving by the two routes, and, since a phase shift of 360° per wave length occurs in space, the combined amplitude depends upon the difference between the two distances. If the difference is an even number of half wavelengths, the two waves combine additively to produce a maximum combined wave, but if the difference is an odd number of half wavelengths, the two waves combine subtractively to produce a minimum combined wave. If point D is moved arcuately upwardly about O as a center so that the distance OD is constant, the distance OCD will vary, giving varying differences of lengths of routes, and the combined amplitudes of the waves will vary accordingly, producing the distortion of the lobe, such as shown in Fig. 2. Such a distorted lobe is of almost no value for the establishment of an equi-signal path.

Fig. 4 shows the relation between a pair of vertically polarized radio waves used for vertical guidance and glide path in the micro-wave equi-signal instrument landing system prior to my invention. In order to avoid the type of lobe distortion shown in Fig. 2, it is essential that both lobes be kept off the ground. Although narrow lobes are used, and, although the lobes are quite close to each other, the angle of the glide path 22 is much steeper than is desirable. The steepness of the glide path renders the landing operation extremely difficult and hazardous. This is particularly true because of the further reason that the glide path is not well defined because the two lobes are of necessity very close together.

It is a further object of the present invention, therefor, to provide a landing system in which the angle of the glide path may be reduced to virtually any desired slope and at the same time to provide a glide path which is defined much more sharply than in systems of the prior art.

In accordance with the present invention, instead of plane polarized radio waves, I employ circularly polarized radio waves, and thereby accomplish new and unexpected results. In explanation of my invention, attention is called to the now well known fact that when a lobe of circularly polarized radio waves strikes a reflecting surface, the direction of rotation of polarization is reversed by reflection. This is illustrated in Fig. 3 in which a lobe of circularly polarized radio waves is shown with the axis of rotation close to and substantially parallel with the ground, so that virtually one half of the lobe is reflected thereby. The unreflected portion of the lobe is indicated at 20 while the reflected portion is indicated at 21. It follows, therefore, that if the lobe portion 20 is circularly polarized in the clockwise rotation of polarization, the portion 21 is circularly polarized with a counterclockwise rotation of polarization. Now, if a receiver is employed which is selectively sensitive to radio waves circularly polarized only in the clockwise direction, the unreflected lobe portion 20 will register thereupon with substantially no evidence of distortion as in the case of plane polarized waves as previously mentioned.

Fig. 5 shows the relation between the lobes of circularly polarized radio waves used for vertical guidance and the glide path in the system as improved by my invention. Because circularly polarized radio waves are transmitted, and because the airborne receiving equipment is sensitive to only those waves having the original direction of rotation of polarization, the lobes may be placed as desired, resulting in a more sharply defined glide path having any desired angle of approach. The angle between the axes of the two lobes may be enlarged to a much greater degree than illustrated in Fig. 4 so that an extremely sharp glide path may be defined, while at the same time the axis of the lower lobe may be adjusted as low as desired, irrespective of the ground, to provide a glide path 22 which is much less steep than is possible in the case of plane polarized lobes as shown in Fig. 4.

While not essential to the practice of the present invention, I prefer to employ a metallic reflector 25 for the purpose of eliminating the pseudo Brewster angle effect. It might be explained that due to the conductivity and dielectric characteristics of the earth, the magnitude and phase of radio waves are altered upon reflection. This alteration is not the same for horizontally polarized waves as it is for vertically polarized waves. A circularly polarized wave may, for purposes of analysis, be resolved into two plane polarized waves, one vertically polarized and the other horizontally polarized, equal in magnitude, and having a phase difference of ninety degrees. If a circularly polarized wave is resolved into a horizontally polarized wave and a vertically polarized wave, and the two resulting waves reflected from the earth, the reflected waves are not ordinarily ninety degrees apart in phase and equal in magnitude, and these reflected waves combine to produce an elliptically polarized wave rather than a circularly polarized wave. Therefore, in order that the reflected wave be truly circularly polarized rather than elliptically polarized it is necessary that the reflection occur from a high conductivity reflecting surface, such as the surface of a metallic reflector 25.

Antennas for producing circularly polarized radio waves are simple. Two dipoles, mounted at right angles to each other and operated ninety electrical degrees apart will produce circularly polarized radio waves. Such an antenna is shown in Fig. 7. This antenna will also receive selectively as to direction of rotation of circular polarization. That is, the output of such an antenna to the remainder of the receiving equipment is maximum for a wave having one direction of rotation of circular polarization and zero for a wave having the opposite direction of rotation of circular polarization. It is pointed out, however, that this antenna, and other antennas used to receive circularly polarized radio waves selectively as to direction of rotation of circular polarization, will respond at least to a limited extent to elliptically polarized radio waves, even when the direction of rotation of elliptical polarization is opposite to that direction of rotation of polarization to which the antenna is most responsive. It is important, then, that when such an antenna is used for the purpose of eliminating the response to a reflected wave, the reflected wave be circularly polarized rather than elliptically polarized. As pointed out in the preceeding paragraph, the reflection should occur from a high conductivity reflecting surface to best accomplish the purpose of the invention.

Arrays, reflectors, horns, or metal lens may be used with the antenna shown in Fig. 7 to increase gain or to produce lobes of desired shape.

It has been common practice in equi-signal systems to identify the lobes by modulating one at 90 cycles and the other at 150 cycles. Filters used with the receiving equipment separate these frequencies, and an indication meter is used which compares the strength of the signals in each lobe. Such a method of identification of lobes is entirely workable with the system as improved by my invention.

Another method of identifying the lobes, which I shall describe in detail, consists of switching them on and off alternately, and using an identifying signal, transmitted on a separate frequency to indicate which lobe is being transmitted at a given time.

In Fig. 8, 30 is a micro-wave transmitter; 31 is the identifying signal transmitter; 32 is a motor which drives switches 33 and 34; 35 and 36 are antennas for producing lobes of circularly polarized micro-waves polarized in the same direction of rotation, 35 producing the upper lobe for vertical guidance, and 36 producing the lower lobe of substantially equal strength to that of the upper lobe for vertical guidance. The operation is as follows: Motor 32 drives switch 33 which keys transmitter 31, and also drives switch 34 which switches the output of micro-wave transmitter 30 from antenna 35 to antenna 36. When antenna 35 is transmitting the upper lobe, antenna 37 is transmitting the identifying signal.

In Fig. 9, there is disclosed airborne receiver means selective to the direction of rotation of circular polarization of circularly polarized radio waves and responsive to radio waves having the same direction of rotation of circular polarization as the waves produced by the transmitting means. The airborne receiver means consists of receiver 40 for receiving the identifying signal, synchronous motor 41, switch 42 being a means for separating the signals received by the receiver means, micro-wave receiver 44, and means for comparing the strength of the signals including indicating instrument 45. The transmitter sends out a signal which is received by the receiver 40 and which signal maintains the synchronous motor 41 in synchronism with motor 32. Such means are well known in the art as represented, for example, by United States Patent to Poole 1,928,793. Antenna 43 is selective to direction of rotation of circularly polarized radio waves, responding to those waves transmitted by previously mentioned antennas 35 and 36. The output of 44 varies in accordance with the strength of the received signal. The operation is as follows: Output of receiver 40 energizes synchronous motor 41, which rotates switch 42, so that when the upper lobe is being transmitted, switch 42 is in the indicated position, and when the lower lobe is being transmitted, switch 42 is in the position opposite that shown. Indicating instrument 45 is so connected to switch 42 that when the upper lobe is being transmitted, output current from micro-wave receiver 44 tends to cause the pointer of 45 to move toward "H"; and, when the lower lobe is being transmitted, output current from 44 tends to cause the pointer of 45 to move toward "L." The indication of 45, then, is a comparison of the strength of the signals received from each lobe, and hence, an indication of the position of the aircraft with respect to the predetermined glide path.

Many other systems of indication and identification of lobes may be used.

The equipment for horizontal guidance may be similar to that described, or an entirely different system may be used. If similar equipment is used, the lobes may be positioned as shown in Fig. 6.

The required size of reflector 25 depends upon the height of the transmitting antennas; the lower the antennas, the smaller the required reflector. Generally, the reflector should be of such size, shape, and position as to prevent reflection of waves by the earth to the point where the waves are received, in order to prevent elliptical distortion of the circular polarization by earth reflection of the waves. In Fig. 11, waves produced at O and reflected by the earth in the direction JK, will be elliptically distorted; however, waves produced at O and reflected by high conductivity reflector 25 in the direction GH will not be distorted.

It is desirable that no elliptical distortion of the circular polarization of the waves be present in the vicinity of the glide path, the vicinity of the glide path being considered as that space in which the described apparatus is useful in the navigation of aircraft. In Fig. 12, the space between LM and RS may be considered the vicinity of the glide path.

In some locations, where the reflecting characteristics of the earth are suitable, the reflector may not be necessary.

While I have described my invention in certain specific embodiments, it is understood that it is broad in scope, and limited only by the appended claims.

I claim:

1. Radio aids to air navigation comprising transmitter means for producing two lobes of radio waves circularly polarized in the same direction of rotation, said means being arranged to produce signals of substantially equal strength from each lobe along a predetermined path, a substantially plane horizontal high conductivity reflecting means arranged beneath said path for preventing earthward directed radio waves produced by first mentioned means from being reflected by the earth to the vicinity of said path, airborne receiver means selective to direction of rotation of circular polarization of circularly polarized radio waves and responsive to radio waves having the same direction of rotation of circular polarization as the waves produced by first mentioned means for responding to radio waves produced by first mentioned means, said receiver means including means for separating the signals received by said receiver means from each of the aforementioned lobes, and means for comparing the strengths of the signals received by said receiver means from each of the aforementioned lobes.

2. Radio aids to air navigation comprising transmitter means for producing two lobes of radio waves circularly polarized in the same direction of rotation, said means being arranged to produce signals of substantially equal strength along a predetermined path, high conductivity reflecting means arranged beneath said path for preventing earthward directed radio waves produced by first mentioned means from being reflected by the earth to the vicinity of said path and for itself to reflect such earthward directed radio waves produced by first mentioned means to the vicinity of said path, and airborne receiver means selective to the direction of rotation of circular polarization of circularly polarized radio waves and responsive to radio waves having the same direction of rotation of circular polarization as the waves produced by first mentioned means for responding to radio waves produced by first mentioned means.

3. Radio aids to air navigation comprising transmitter means for producing two lobes of radio waves circularly polarized in the same direction of rotation, said means being arranged to produce signals of substantially equal strength from each lobe along a predetermined path, and high conductivity reflecting means arranged beneath said predetermined path in the path of earthward directed radio waves produced by said transmitter means for preventing such last mentioned waves from being reflected by the earth to the vicinity of said predetermined path, said reflecting means being itself adapted for reflecting said earthward directed radio waves produced by first mentioned means to the vicinity of said path.

4. Radio aids to air navigation comprising transmitter means for producing two lobes of radio waves circularly polarized in the same direction of rotation, said means being arranged to produce signals of substantially equal strength from each lobe along a predetermined path about the earth, substantially plane horizontal reflecting means arranged beneath said path for preventing earthward directed radio waves produced by said transmitter means from being reflected by the earth to the vicinity of the aforementioned path, said reflecting means being itself adapted for reflecting said earthward directed radio waves produced by first mentioned means to the vicinity of the aforementioned path, and means for identifying the signals in at least one of the aforementioned lobes.

VIRGIL M. BRITTAIN.

REFERENCES CITED

The following references are of record in the file of this patent:

UNITED STATES PATENTS

| Number | Name | Date |
|---|---|---|
| 1,841,654 | Korschenewsky | Jan. 19, 1932 |
| 1,934,924 | Heintz | Nov. 14, 1933 |
| 1,958,886 | Chubb | May 15, 1934 |
| 2,093,885 | Gerth et al. | Sept. 21, 1937 |
| 2,116,667 | Chireix | May 10, 1938 |
| 2,297,228 | Kramar | Sept. 29, 1942 |
| 2,347,180 | Granqvist | Apr. 25, 1944 |
| 2,421,023 | Frink | May 27, 1947 |
| 2,426,992 | Folland et al. | Sept. 9, 1947 |